April 2, 1957  R. E. BURNS  2,787,479
THIMBLE TYPE PIPE COUPLING WITH PIPE WEDGING MEANS
Filed Dec. 19, 1952  2 Sheets-Sheet 2

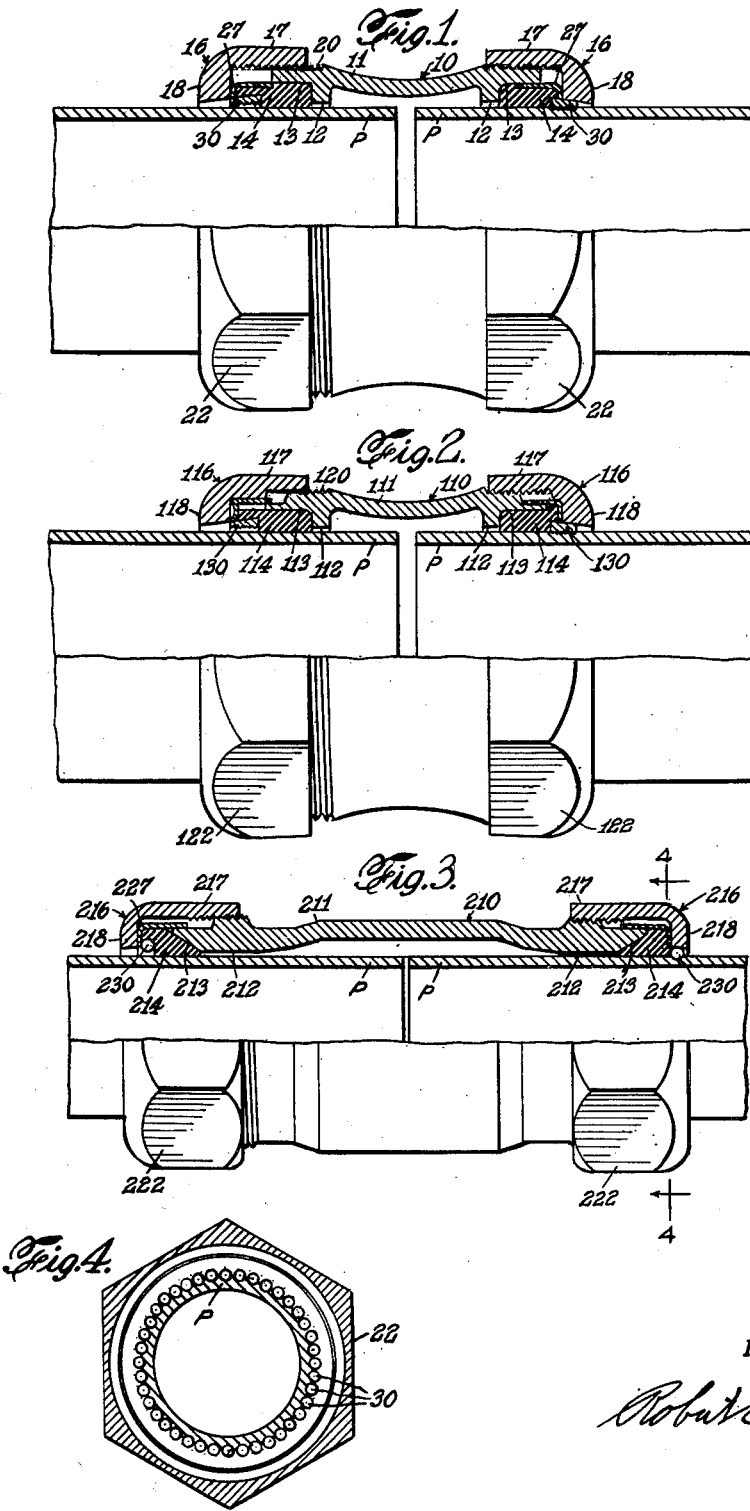

INVENTOR.
Robert E. Burns

United States Patent Office 2,787,479
Patented Apr. 2, 1957

2,787,479

THIMBLE TYPE PIPE COUPLING WITH PIPE WEDGING MEANS

Robert E. Burns, Valley Stream, N. Y., assignor to Dresser Industries, Inc., a corporation of Delaware Application December 19, 1952, Serial No. 326,992

9 Claims. (Cl. 285—232)

The present invention relates to couplings for pipe, tubing and the like, hereinafter referred to generically as "pipe" and is more particularly concerned with couplings for connecting plain end pipe in flexible fluid-tight relationship while simultaneously locking the pipe against withdrawal from the coupling in an axial direction.

In vertical pipelines, as, for example, in wells and the like, the couplings between the several sections of pipe making up the line must not only provide a fluid-tight joint between successive pipe sections but must also resist the longitudinal stresses exerted by the weight of the pipe sections to prevent withdrawal of the pipe sections from the couplings. In long pipelines, as, for example, in wells 150 to 300 feet deep, the resulting longitudinal stresses on the pipe and the pipe couplings becomes correspondingly great. Heretofore, for lack of more effective means, it has been common practice to join the pipe sections in such vertical pipelines by means of conventional screw-threaded couplings. Such couplings require the use of threaded pipe and provide a rigid non-yielding connection. As the cutting of threads weakens the pipe wall by materially reducing the wall thickness in the threaded portion, it has heretofore been necessary to use rather heavy pipe so that the pipe walls will have sufficient strength notwithstanding the thread. In order to obtain an effective fluid-tight connection, it is necessary that the threads be accurately cut. This increases the time and cost of making the installation. Moreover, the rigidity of the connection obtained with a screw-threaded coupling is disadvantageous in long vertical pipe installations since vibrations and flexing forces cause excessive stress on the threaded connections.

In order to avoid the above mentioned disadvantages of screw couplings and to facilitate the assembly of the pipelines, it has been proposed to use gasket-type couplings comprising annular gaskets and gasket-compressing means. In connecting pipe sections with a gasket-type coupling, it is merely necessary to "stab" the ends of the sections into the coupling and then tighten the gasket-compressing means to squeeze the gasket into fluid-tight sealing engagement with the outer surface of the pipe. No threads on the pipe are needed. The ordinary gasket-type coupling commonly used in horizontal pipelines depends, for its effectiveness, upon the frictional engagement between the gaskets and the pipe sections. In vertical installations, however, where the weight of the pipe must be supported, this frictional engagement is not ordinarily adequate to withstand the longitudinal stresses on the pipeline. In order to resist these longitudinal forces, gasket-type couplings have heretofore been proposed which have locking means intended to bite into, or grip, the pipe in a manner to prevent its withdrawal from the couplings. In some couplings of this category, the gasket-compressing means is also utilized to wedge or press locking elements into engagement with the pipe. While this provides a relatively simple arrangement, it has been found to raise a very difficult problem in obtaining proper coordination of the sealing and locking functions. When the same movable element of the coupling, for example a gasket follower ring, is utilized both to apply sealing pressure to the gasket and to actuate the locking element, for example by causing them to wedge between the follower and the pipe, it has been found extremely difficult to secure proper gasket pressure for a fluid-tight seal and, at the same time, to assure effective locking of the pipe. In some cases, full gasket pressure is reached so that the follower is stopped before proper locking action has been obtained. In other instances, the locking occurs prematurely so that the follower is locked against the further movement needed to obtain adequate gasket pressure for a fluid-tight seal. These difficulties are increased by the fact that pipe of the same nominal size varies in actual outside diameter so that it is necessary to tighten the follower more in some cases than in others.

It is an object of the present invention to overcome these difficulties by coordinating the sealing and locking functions of the coupling in such manner as to assure proper gasket pressure and proper locking action at the same time. This coordination is obtained by "tripping" the locking mechanism at a predetermined point in the tightening of the follower. During an initial increment of follower movement, the locking mechanism is held out of action while the follower is brought up snugly against the gasket and initial gasket pressure is applied. At a predetermined point in the application of gasket pressure, the locking mechanism is tripped so that it begins to come into operation. Subsequent movement of the follower applies final pressure to the gasket and, at the same time, completes the locking action so that the pipe is securely locked against withdrawal from the coupling. By thus making the tripping or "triggering" of the locking elements depend on the attainment of a predetermined initial gasket pressure less than the final pressure, simultaneous sealing and locking is assured.

The nature, objects and advantages of the invention will be more fully understood from the following specification and claims and from the accompanying drawings in which preferred embodiments of the invention have been illustrated by way of example. In the drawings:

Fig. 1 is a side elevation partly in longitudinal section of a coupling in accordance with the invention, the coupling being shown partly installed on adjacent pipe ends.

Fig. 2 is a view similar to Fig. 1 showing another embodiment of the invention.

Fig. 3 is a further view similar to Fig. 1 showing a third embodiment.

Fig. 4 is a cross section taken approximately on the line 4—4 in Fig. 3.

Figure 5A:
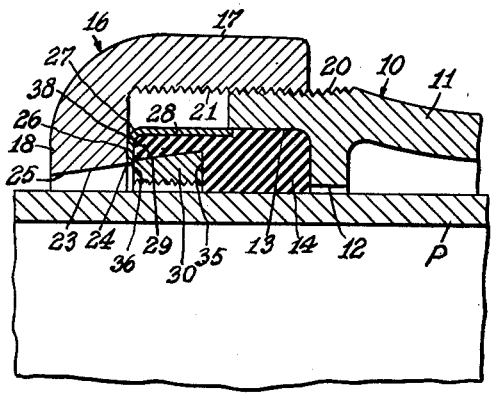
Figs. 5a and 5b are enlargements, respectively, of portions of the left hand end and right hand end of Fig. 1.
Figure 5B:
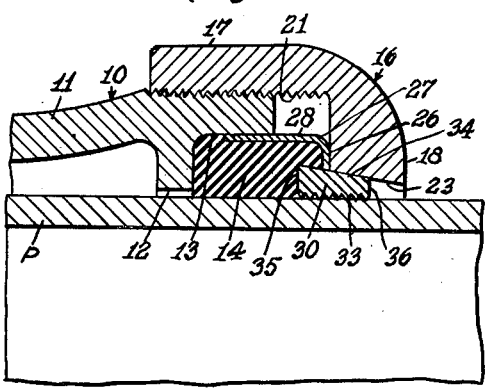

Referring to the drawings and more particularly to Figs. 1, 5a and 5b, a pipe coupling 10 in accordance with the invention is shown in position around the ends of two adjacent sections of plain end pipe P. The coupling comprises a tubular central body portion or "middle ring" 11 having pipe-receiving necks or bores 12 of a diameter to receive the pipe snugly yet freely. At its opposite ends, the body portion 11 is enlarged or flared out to provide annular gasket recesses 13 between the enlarged end portions of the body and the pipe.

Disposed in each of the gasket recesses 13, there is an annular gasket 14 having a cross sectional shape to conform approximately to the gasket recess and the adjacent portions of the pipe and coupling. Thus, as illustrated in Figs. 1, 5a and 5b, the gasket is generally rectangular in cross section. The gasket is preferably formed as a continuous endless ring although it may be split if desired. The gasket 14 is formed from rubber or rubber composition, these terms being used generically to include natural and synthetic rubbers and other elastomeric compounds or compositions having like properties and characteristics. The material is relatively firm and solid but sufficiently resilient and elastic to flow under pressure to conform to the surfaces between which it is confined. When the couplings are to be used on lines subjected to hydrocarbon fluids, the gaskets are preferably formed from a rubber composition that is resistant to attack by hydrocarbons. Examples of such resistant rubber compositions suitable for use with hydrocarbon gases and oils are those known commercially by the trade designations "neoprene" (polychloroprene), "Buna-N" or "Gr-A" as well as "butadiene-acrylonitrile copolymers." It will be understood, however, that the invention is not limited to the use of these specific materials.

The annular gasket 14 is subjected to pressure to press it into sealing engagement with the pipe P and the middle ring 11 by means of a gasket-compressing member or follower 16 having an annular skirt portion 17 that encircles the gasket and an inwardly projecting annular flange or end wall portion 18 that is adapted to press on the outer end of the gasket. Provision is made for moving the follower 16 axially toward the middle ring 11 to apply pressure to the gasket. In the embodiment shown in Figs. 1, 5a and 5b of the drawings, this is achieved by externally threading the ends of the middle ring, as indicated at 20, and providing corresponding internal threads 21 on the interior of the skirt portion 17 of the follower 16. With this arrangement, the follower can be screwed on to the middle ring like a nut and is thereby moved axially toward the middle ring so as to apply pressure to a gasket disposed in the gasket recess between the middle ring and the follower. The exterior of the follower nut is preferably provided with a suitable wrench section, as indicated at 22 in Fig. 1, to the facilitate screwing the follower nut on the middle ring or body portion of the coupling. The inner edge 23 (Fig. 5a) of the inwardly projecting end flange portion of the follower forms a circular pipe-receiving aperture. The diameter of this aperture is somewhat greater than the outside diameter of the pipe so that there is a space between the edge 23 and the pipe. The edge 23 is preferably inclined or tapered, as clearly shown in Figs. 5a and 5b, so that the inner corner 24 is spaced farther from the pipe than the outer corner 25. The tapered surface of the edge preferably forms an angle of about 7 to 15 degrees to the axis of the pipe and coupling. It has been found that best results are obtained with an angle of about 10 degrees. The annular inner end surface 26 of the follower extends radially outwardly from the inner edge corner 24 and is approximately perpendicular to the axis of the pipe and coupling.

Between the follower 16 and the gasket, there is preferably interposed a retainer cup 27. This is especially desirable when, as in the embodiment illustrated in Figs. 1, 5a and 5b, the follower is screwed onto the end portion of the middle ring and hence has a rotary, as well as an axial, component of movement. The retainer cup 27 acts somewhat like a washer to permit freer turning of the follower nut. As shown in the drawings, the retainer 27 is cup-shaped, having an annular skirt portion 28 and an inwardly projecting end flange portion 29. The skirt portion 28 embraces the outer end portion of the gasket while the inwardly projecting flange portion 29 is disposed between the end of the gasket and the inwardly projecting portion 18 of the follower. The inner edge of the inwardly projecting flange portion 29 of the retainer cup is shown as terminating substantially flush with the inner corner 24 of the follower. For the sake of clarity and simplicity of the description and drawings, the reference numeral 23 may be considered as applying to the inner edge of the retainer cup as well as that of the follower and, likewise, the reference numeral 24 may be considered as designating the inner corner of the inner edge of the retainer cup when a retainer cup is employed in the coupling.

Figure 8:
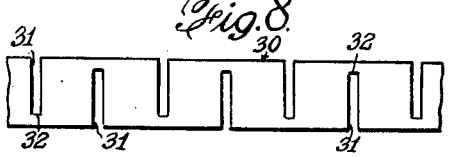
Fig. 8 is a developed outside view of a locking ring such as is shown in Figs. 1 and 2.

The structure so far described provides for making a fluid-tight joint by tightening the follower ring 16 to apply pressure to the annular gasket 14, thereby pressing the gasket into fluid-tight sealing engagement with the pipe P and the middle ring 11. The locking of the pipe to prevent its withdrawal from the coupling in a longitudinal direction is achieved by a plurality of locking elements 30 which are disposed in the gasket recess at the outer end of the gasket and are adapted to wedge between the pipe and the inner edge 23 of the inwardly projecting flange portion 18 of the follower. The locking elements 30 may be individual elements spaced around the pipe, preferably at regular intervals, or they may be interconnected with one another in such manner as to permit movement toward and away from one another. One suitable construction is illustrated in Fig. 8 which is an outside developed view of a circular series or ring of locking elements. It will be seen that successive locking elements 30 are separated from one another by spaces or slots 31 except for thin bridge portions 32 which are disposed alternately at opposite end edges of the locking elements. This construction permits expansion and contraction of the ring, or, in other words, permits the locking elements to move away from and toward one another within limits. As shown in Figs. 1, 5a and 5b, the locking elements 30 are substantially wedge-shaped or trapezoidal in cross section. The inner face 33 is substantially parallel to the axis of the pipe and is preferably provided with teeth adapted to bite into the pipe wall. The outer surface 34 is inclined, preferably at the same angle as the inclined edge 23 of the follower flange 18, for example ten degrees. The inner end 35 and outer end 36 are square, being approximately perpendicular to the axis of the pipe. The thickness of the locking element 30 at its outer end is less than the space between the inner corner 24 of the follower and the pipe. The thickness of the locking element at the inner end 35 is greater than the space between the pipe and the outer corner 25 of the inwardly projecting flange 18 of the follower 16. In a section perpendicular to the longitudinal axis of the pipe, the locking elements 30 are preferably arcuate, to conform approximately to the curvature of the pipe. The locking elements are formed of hard material, for example hard steel.

The locking elements are disposed in the outer end portion of the gasket with the inner faces of the locking elements approximately flush with the inner periphery of the gasket. The outer end of the gasket is accordingly recessed to receive the locking elements. When individual, unconnected locking elements are used, they are suitably mounted in, bonded to, or held by the gasket so as to be properly positioned by the gasket. When an adhesive bonding is used, it should be of such nature that it does not interfere with movement of the locking elements relative to the gasket in an axially outward direction. For example, the locking elements may be bonded to the gaskets only at their inner ends 35. When the locking elements are flexibly interconnected, as, for example, illustrated in Fig. 8, so as to form a ring, they are held in place by their interconnections and bonding to the gasket is not necessary although it may nevertheless be advantageously employed.

With the follower screwed loosely on the middle ring and the gasket in an uncompressed condition, the locking elements 30 are in approximately the position illustrated at the left hand end of Fig. 1 and, on an enlarged scale, in Fig. 5a. In this position, the locking elements 30 are spaced radially outwardly from the pipe so that the latter can readily be "stabbed" into the coupling without interference by the locking elements. A portion of the square outer end 36 of each locking element engages a portion of the square inner surface 26 of the inwardly projecting flange portion 18 of the follower 16 or—when a retainer cup 27 is used—the corresponding inner face of the retainer. To simplify the description, the inner face of the inwardly projecting end flange 18 of the follower and the corresponding inner face of the retainer cup are considered to be the same. Thus, in the initial positions of the locking elements, their outer end faces 36 engage the approximately radial inner face of the inwardly projecting flange 18 of the follower at points radially outwardly of the corner 24. Hence, during an initial increment of movement of the follower as it is screwed onto the threaded end portion of the middle ring, the locking elements 30 are pushed ahead of the follower by the interengagement of the ends of the locking elements with the above mentioned approximately radial surface 26 of the follower so that the locking elements cannot prematurely become wedged between the inner edge 23 of the follower and the pipe.

As the follower continues to be screwed on and reaches a point where initial gasket pressure is created, an annular portion 38 of the gasket that surrounds the locking elements is compressed in an axial direction by the follower. This axial compression of the gasket material results in radial expansion. Hence, the gasket material tends to expand radially outwardly insofar as permitted by the confining surfaces and also tends to expand radially inwardly. The radially inward expansion of the portion 38 of gasket material surrounding the locking elements 30 presses the locking elements 30 radially inwardly so that the outer ends of the locking elements ride in under the inner corner 24 of the inner edge 23 of the follower. By being thus pushed inwardly off of the approximately radial inner surface 26 of the follower, the locking elements are "tripped" so that they can now wedge in between the inner edge 23 of the follower and the pipe as the follower continues to be tightened. Moreover, it will be seen that gasket pressure on the inner ends 35 of the locking elements tends to push the locking elements into the tapered space between the pipe and the inner edge 23 of the follower and to resist axially inward movement of the locking elements by frictional engagement of the inner edge 23 of the follower with the outer surfaces 34 of the locking elements. After the tripping of the locking elements, tightening of the follower nut is continued to apply predetermined final pressure to the gasket and, at the same time, to force the locking elements 30 radially inwardly by wedging action to cause the teeth on the inner faces of the locking elements to bite into the pipe and thereby lock it securely against withdrawal from the coupling. By the use of initial gasket pressure to trip or "trigger" the locking elements, proper gasket pressure and also proper locking action are assured.

At the right hand end of Fig. 1 and in Fig. 5b, the follower, gasket and locking elements are shown in final position, with full gasket pressure and with the locking elements 30 wedged between the pipe and the inner edge 23 of the follower. It will be understood that with pipe of smaller outside diameter, the locking elements may move farther to the right than is shown in Fig. 5b. With smaller pipe, the follower nut must be screwed on farther to obtain proper gasket pressure and this automatically causes the follower to move farther inwardly in an axial direction relative to the locking elements so that the locking elements are wedged in farther to grip the smaller pipe.

Figure 6A:
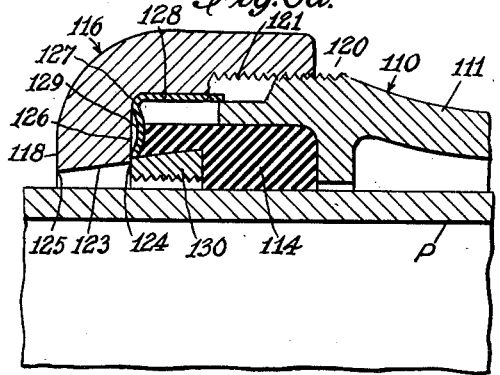
Figs. 6a and 6b are similar enlargements of portions at the left and right hand end, respectively, of Fig. 2.
Figure 6B:
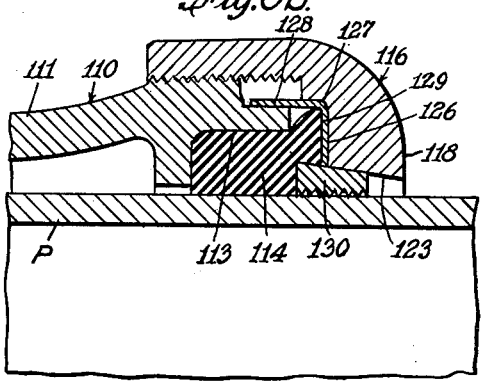

Another embodiment of the invention is illustrated in Figs. 2, 6a and 6b where corresponding parts are designated by the same reference numerals as in Figs. 1, 5a and 5b with the addition of 100. The coupling 110 comprises a body portion or middle ring 111 having a gasket recess 113, an annular gasket 114 disposed in the recess and a follower 116 which screws onto the middle ring to apply sealing pressure to the gasket. The follower 116 has an annular inwardly projecting flange 118 of which the inner peripheral edge 123 is preferably tapered, as shown, and is spaced from the pipe P. Locking elements 130, which may be the same as, or similar to, the locking elements 30 of Fig. 1, are disposed in the gasket recess, the outer end of the gasket being suitably recessed to receive the locking elements. In the starting position of the follower 116, the locking elements 130 are spaced from the pipe and their outer ends engage an annular approximately radial face 126 of the follower which extends outwardly from the inner peripheral corner 124. A retainer cup 127 has an annular skirt portion 128 surrounding the outer end portion of the gasket and an inwardly projecting flange portion 129 which is bowed, as shown in Fig. 6a, and has its inner edge adapted to bear on the outer surfaces of the locking elements adjacent their outer ends. The "tripping" of the locking elements is substantially as described above, except that the effect of initial gasket pressure to press the locking elements inwardly, and thereby trip them, is supplemented by the action of the bowed flange portion 129 of the retainer cup 127. The pressure of the gasket on the bowed flange portion tends to cause the flange to flatten out, as illustrated in Fig. 6b, and this flattening, in turn, causes the inner edge of the flange to press inwardly on the outer ends of the locking elements 130 so that the locking elements are pushed inwardly beyond the corner 124 of the follower and are thereby tripped so that they will wedge between the inner edge 123 of the follower and the pipe, as the follower is further tightened. The flange portion 129 of the retainer is preferably divided into sectors by circumferentially spaced radial slots to facilitate its flattening out under initial gasket pressure.

Figure 7A:
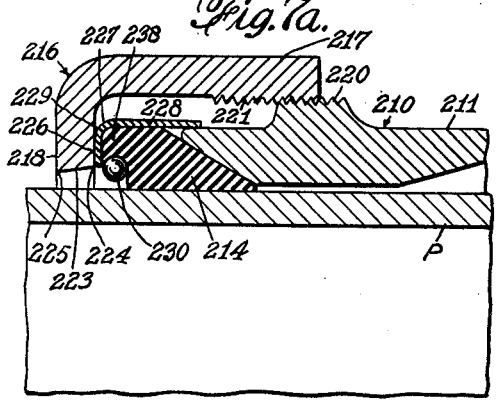
Figs. 7a and 7b are similar enlargements of portions at the left and right hand end, respectively, of Fig. 3.
Figure 7B:
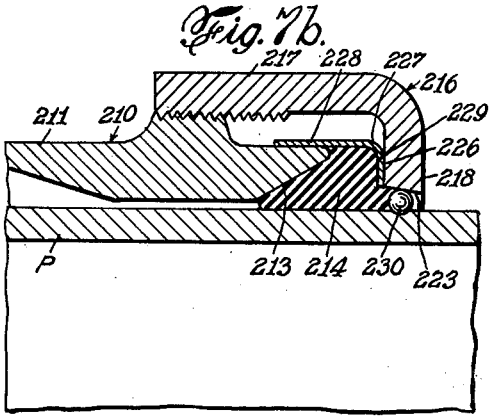

A further embodiment of the invention is shown in Figs. 3, 7a and 7b where corresponding parts of the coupling are designated by the same reference numerals as in Figs. 1, 5a and 5b, with the addition of 200. The coupling 210 comprises a body portion or middle ring 211 the ends of which are flared outwardly to provide gasket recesses 213, each accommodating an annular gasket 214. A follower 216 has an internally threaded skirt portion 217 adapted to screw onto the middle ring 211 and an inwardly projecting annular flange 218 adapted to bear on the gasket 214—as the follower is tightened—to apply pressure to the gasket. The flange 218 of the follower has a beveled inner edge 223 that is spaced from the pipe P. A retainer cup 227 has an annular skirt portion 228 surrounding the gasket and an inwardly projecting annular flange portion 229 disposed between the gasket and the corresponding face 226 of the follower. The locking elements comprise a plurality of balls 230 formed of hard, crush-resistant material, such as hard steel. The balls 230 have a radius that is less than the distance between the inner corner 224 of the follower flange 218 and the pipe and a diameter that is greater than the distance between the outer edge 225 of the flange 218 and the pipe. In their initial positions, the balls 230 are spaced from the pipe P a distance sufficient that the centers of the balls are radially outside the inner corner 224 of the flange 218, this phrase being understood to include the borderline condition in which the centers of the balls are substantially the same distance from the pipe as the corner 224. The balls are resiliently held in this position, for example by adhesion to the gasket material of the gasket 214. The balls thus engage the inner, approximately radial, surface 226 of the follower or—more precisely—the corresponding face of the retainer cup, these faces being referred to interchangeably as in the embodiment of Figs. 1, 5a and 5b. During the initial tightening of the follower, the balls 230 are pushed ahead of the follower by their engagement with the approximately radial face 226 (Fig. 7a). As initial gasket pressure builds up, a portion 238 of the gasket that is radially outside the balls 230 is compressed in an axial direction and thereby tends to expand in a radial direction so that the gasket material presses radially inwardly on the balls 230. When the balls have been pushed inwardly so that their centers are closer to the pipe than the corner 224 of the follower, the inward pressure of the gasket on the balls is increasingly supplemented by the radially inward component of the force exerted by the follower on the balls. The balls are thus "tripped" from their initial position and, as tightening of the follower is continued, they wedge between the tapered inner edge 223 of the follower and the pipe P, as illustrated in Fig. 7b.

While a relatively small number of balls—for example four—will provide adequate locking action, it is desirable to use a substantially continuous ring of balls so as to restrain cold flow of the gasket material between the balls when they are in the locking position shown in Fig. 7b. Thus, when the balls are in their innermost positions, they are preferably substantially contiguous with one another. When in their initial outer position, as illustrated in Fig. 7a, the balls are sufficiently spaced apart in a circumferential direction to permit their radially inward movement. The balls can advantageously be molded into the gasket during manufacture of the latter so that they are resiliently held in their initial outer position and no separate retaining means is required.

It will be understood that the invention is not limited to the specific embodiments particularly shown and described. For example, while the invention has been illustrated in the form of a straight, double-ended coupling, it is equally applicable to other coupling forms, such as L's, T's, crosses, etc. Moreover, while the exterior of the coupling body has been shown externally threaded to receive an internally threaded follower, other suitable means of achieving relative axial movement of the follower and coupling body may be employed. It will further be understood that, insofar as they are not mutually incompatible, the various features and details of construction of the several embodiments shown and described are interchangeable with one another. Still other modifications within the scope of the invention herein claimed will be apparent to those skilled in the art.

What I claim and desire to secure by Letters Patent is:

1. In a coupling for plain end pipe, a body having a pipe-receiving neck portion and an externally threaded outwardly flared end portion providing an annular gasket recess between said end portion and a pipe received in said neck portion, an annular gasket disposed in said recess and extending axially beyond said end portion, a gasket follower comprising an annular skirt portion surrounding the gasket and having internal threads to engage the external threads of the end portion of the body and an inwardly extending annular flange bearing on the axially outer face of the gasket to apply pressure axially to the gasket, said flange having an annular inner lip spaced from the pipe and an annular substantially radial inner face extending radially outwardly from said lip, and a ring of locking elements disposed inside the gasket at its outer end, each of said elements being of a shape and size to wedge between said lip and the pipe, with an overall radial dimension greater than the radial space between said lip and the pipe but with an axially outer portion of less radial extent than said space between said lip and the pipe, said locking elements in initial position substantially blocking said space but being slightly spaced circumferentially and spaced radially from the pipe and engaging said substantially radial inner face of the follower flange radially outwardly of said inner lip in the uncompressed state of the gasket and being thereby pushed ahead of said flange in an axial direction without wedging action during initial tightening of the follower, said gasket having an annular portion of gasket material surrounding said ring of locking elements and holding said elements in said initial position, said annular portion of gasket material being disposed between said locking elements and said skirt portion of the follower and being expandable in a radially inward direction by the application of pressure in an axial direction by tightening of the follower to trip said locking elements by forcing them radially inwardly so that they ride in under said lip and are thereby released to wedge between said lip and the pipe upon further tightening of the follower to lock the pipe against withdrawal from the coupling and restrain extrusion of gasket material through said space.

2. In a coupling for plain end pipe, a body having a pipe-receiving neck portion and an outwardly flared end portion providing an annular gasket recess between said end portion and a pipe received in said neck portion, an annular gasket disposed in said recess and projecting beyond said end portion, a gasket follower comprising an annular skirt portion surrounding the gasket and an inwardly extending annular flange bearing axially on the axially outer face of the gasket, said flange having an annular inner lip spaced from the pipe and an annular substantially radial inner face disposed outwardly of said lip, means for drawing the follower toward the body to apply pressure to the gasket, and a ring of wedge-shaped locking elements disposed in the gasket recess adjacent said flange, the ends of said elements facing said flange being smaller in a radial direction than the space between said lip and the pipe and the opposite ends thereof being larger than said space, said locking elements in initial position substantially blocking said space but being slightly spaced circumferentially and spaced radially from the pipe and engaging said substantially radial inner face of said flange radially outwardly of said lip in the uncompressed state of the gasket and being thereby pushed ahead of said flange without wedging action during initial drawing up of the follower, said gasket having an annular portion surrounding said ring of locking elements and holding said elements in said initial position, said annular portion of gasket material being expandable in a radially inward direction by the application of pressure in an axial direction by the follower to trip said locking elements by forcing them radially inwardly so that they ride in under said lip and are thereby released to wedge between said lip and the pipe upon further drawing up of the follower to lock the pipe against withdrawal from the coupling and restrain extrusion of gasket material through said space.

3. In a coupling for plain end pipe, a body having a pipe-receiving neck portion and an outwardly flared end portion providing an annular gasket recess between said end portion and a pipe received in said neck portion, an annular gasket disposed in said recess and projecting axially beyond said end portion, a follower ring surrounding the pipe and having a tapered pipe aperture with its larger end toward the gasket and an annular substantially radial inner face extending outwardly from said aperture, the edge of said aperture being spaced radially from the pipe, means for drawing the follower ring toward the body to apply pressure to the gasket, and a ring of locking elements disposed in the gasket recess adjacent said follower ring, each of said elements having an overall radial dimension greater than the radial space between the smaller end of said aperture and the pipe but with an axially outer portion which is smaller in radial extent than the space between the larger end of said aperture and the pipe, said elements in initial position substantially blocking the space between said aperture and the pipe but being slightly spaced circumferentially and spaced radially from the pipe and engaging said substantially radial inner face of the follower ring radially outwardly of said aperture in the uncompressed state of the gasket and being thereby pushed ahead of the follower ring without wedging action as the latter is initially drawn up, said gasket having an annular portion surrounding said ring of locking elements and holding said elements in said initial position, said annular porton of gasket material being expandable in a radially inward direction by the application of pressure in an axial direction by the follower ring to trip said locking elements by squeezing them radially inwardly so that they ride in under the edge of said aperture and are thereby released to wedge between the edge of said aperture and the pipe upon further drawing up of the follower ring to lock the pipe against withdrawal from the coupling and restrain extrusion of gasket material through the space between said aperture and the pipe.

4. In a coupling for plain end pipe, a body having a pipe-receiving neck portion and an outwardly flared end portion providing an annular gasket recess between said end portion and a pipe received in said neck portion, an annular gasket disposed in said recess and projecting axially beyond said end portion, a follower ring surrounding the pipe and having a tapered pipe aperture with the larger end toward the gasket and an annular substantially radial inner face extending radially outwardly from the aperture, the edge of said aperture being spaced radially from the pipe, means for drawing the follower ring toward the body to apply pressure to the gasket, and a ring of locking elements disposed in the gasket recess adjacent the follower ring and substantially blocking the space between said aperture and the pipe to restrain the extrusion of gasket material, said elements being wedge-shaped with their larger ends of greater radial extent than the space between the smaller end of said aperture and the pipe and with their smaller ends toward the follower and of less radial extent than the space between the larger end of said aperture and the pipe, and said elements in initial position being slightly spaced circumferentially and spaced radially from the pipe sufficiently, when the gasket is uncompressed, that the smaller ends of the locking elements engage said substantially radial inner face of the follower ring radially outwardly of said aperture, the locking elements being thereby pushed ahead of the follower ring without wedging action as the latter is initially drawn up, said gasket having an annular portion that surrounds said ring of locking elements and holding said elements in said initial position, said annular portion of the gasket being expandable in a radially inward direction by the application of pressure in an axial direction by the follower ring to trip said locking elements by squeezing them radially inwardly so that they ride in under the edge of said aperture and are thereby released to wedge between the edge of said aperture and the pipe as the follower ring continues to be drawn up, to lock the pipe against withdrawal from the coupling.

5. In a coupling for plain end pipe, a body having a pipe-receiving bore and an end portion of enlarged internal diameter providing an annular gasket recess between said end portion and a pipe received in said bore, an annular gasket disposed in said recess and projecting axially beyond said end portion, a retainer cup having a circumferential skirt portion embracing an outer end portion of the gasket and an end portion engaging the outer end face of the gasket, an annular follower engaging said retainer cup and movable in an axial direction to press said retainer cup toward the body and thereby apply pressure to the gasket, said cup and follower having pipe openings the edges of which are spaced from the pipe, and a plurality of locking elements disposed in the gasket recess adjacent the retainer cup, each of said elements being of a shape and size to wedge between the pipe and edges of said pipe openings of said retainer cup and follower, with an overall radial dimension greater than the radial space between the edges of said openings and the pipe but with axially outer portions smaller in radial extent than said space, said elements in initial position substantially blocking said space to restrain the extrusion of gasket material but being slightly spaced circumferentially and spaced radially from the pipe and engaging the inner face of the end portion of the retainer cup radially outwardly of the edge of the pipe opening thereof in the uncompressed state of the gasket and being thereby pushed ahead of the follower ring without wedging action as the latter is initially moved toward the body, said gasket having an annular portion that is disposed between the locking elements and the circumferential skirt portion of the retainer cup and holding said elements in said initial position, said annular portion of the gasket being expandable in a radially inward direction by the application of pressure in an axial direction by movement of the follower and retainer cup toward the body to trip said locking elements by squeezing them radially inwardly so that they ride in under the edges of said retainer cup and follower and are thereby released to wedge between said edges and the pipe upon further movement of the follower and retainer cup toward said body.

6. In a coupling for plain end pipe, a body having a pipe-receiving bore and an end portion of enlarged internal diameter providing an annular gasket recess between said end portion and a pipe received in said bore, an annular gasket disposed in said recess and projecting axially beyond said end portion, a follower ring surrounding the pipe and movable toward said body to apply pressure to said gasket, said follower ring having a flat inner end surface and a pipe opening, the peripheral edge of which is spaced from the pipe, a plurality of locking elements disposed in the gasket recess adjacent said follower ring, each of said elements being of a shape and size to wedge between said peripheral edge and the pipe, with an over-all radial dimension greater than the radial space between the edge of said opening and the pipe but with an axially outer portion of smaller radial extent than the space between said edge and the pipe, said locking elements being held by said gasket in initial position substantially blocking said space to restrain the extrusion of gasket material but being slightly spaced circumferentially and spaced radially from the pipe and engaging the inner face of said follower ring radially outwardly from the edge of said opening when the gasket is uncompressed so as to be pushed ahead of the follower ring without locking action as the latter is initially moved toward the body, and a gasket retainer cup having a circumferential skirt portion embracing the outer end portion of the gasket and an inwardly projecting end flange portion disposed between the outer end of the gasket and the inner end face of the follower ring, said end flange as viewed in axial section being bowed and having its radially inner edge bearing radially on the locking elements, said bowed flange being flattened out against said flat inner surface of the follower by the application of pressure to the gasket by the follower ring to force the inner edge of said flange radially inwardly and thereby trip said locking elements by pressing them radially inwardly so that they slip in under the edge of the pipe opening in the follower ring and are thereby released to wedge between said latter edge and the pipe upon further movement of the follower ring toward said body.

7. In a coupling for plain end pipe, a body having a pipe-receiving bore and an end portion of enlarged internal diameter providing an annular gasket recess between said end portion and a pipe received in said bore, an annular gasket disposed in said recess and projecting axially beyond said end portion, a follower ring surrounding the pipe and movable axially toward said body to apply pressure to said gasket, said follower ring having a pipe opening the peripheral edge of which is spaced from the pipe and an annular inner face extending radially outwardly from said edge, an annular series of balls spaced slightly from one another and held in the outer end of the gasket adjacent the follower ring in position substantially to block the radial space between the pipe and the peripheral edge of the pipe opening in the follower ring to restrain extrusion of gasket material through said opening, said balls having a radius materially less, and a diameter greater, than the radial space between the pipe and the peripheral edge of the pipe opening in the follower ring so as to be adapted to wedge in said space and being spaced from the pipe in initial position with the centers of said balls disposed radially outwardly of the peripheral edge of the pipe opening in the follower ring when the gasket is uncompressed so that the balls engage said inner face of the follower ring outwardly of said edge and are pushed ahead of the follower ring without wedging action as the latter is initially moved toward the body, said gasket having a portion that is disposed radially outwardly of said balls and is expandable in a radially inward direction by the application of pressure in an axial direction by movement of the follower ring toward the body to squeeze said balls radially inwardly so that their centers are radially inward of the peripheral edge of follower ring and the balls thereby wedge between said edge and the pipe upon further movement of the follower ring toward said body.

8. In a coupling for plain end pipe, a body having a pipe-receiving bore and an end portion of enlarged internal diameter providing an annular gasket recess between said end portion and a pipe received in said bore, an annular gasket disposed in said recess and projecting axially beyond said end portion, a follower ring surrounding the pipe and movable axially toward said body to apply pressure to said gasket, said follower ring having a tapered pipe opening the peripheral edge of which is spaced from the pipe and an annular inner face extending radially outwardly from said edge, the larger end of said tapered opening being toward the gasket, a ring of balls spaced slightly from one another and held in the outer end portion of the gasket adjacent the follower ring in position substantially blocking the radial space between the pipe and the peripheral edge of the pipe opening in the follower ring to restrain extrusion of gasket material through said space, said balls having a radius materially less than the radial space between the pipe and the peripheral edge of the larger end of the tapered pipe opening in the follower ring, and a diameter greater than the radial space between the pipe and the peripheral edge of the smaller end of the pipe opening in the follower ring, and being spaced from the pipe in initial position with the centers of said balls disposed radially outwardly of the peripheral edge of the pipe opening in the follower ring when the gasket is uncompressed so that the balls engage said inner face of the follower ring outwardly of said edge and are pushed ahead of the follower ring without wedging action as the latter is initially moved toward the body, said gasket having a portion that surrounds said ring of balls and is expandable in a radially inward direction by the application of pressure in an axial direction by movement of the follower ring toward the body to squeeze said balls radially inwardly so that their centers are radially inward of the peripheral edge of the follower ring and the balls thereby wedge between said edge and the pipe upon further movement of the follower ring toward said body, said balls being substantially contiguous with one another when in their inner positions.

9. In a coupling for plain end pipe, a body having a pipe-receiving bore and an end portion of enlarged internal diameter providing an annular gasket recess between said end portion and a pipe received in said end portion and a pipe received in said bore, an annular gasket in said recess, a follower ring surrounding the pipe at the end of said body and movable toward the body to apply pressure to said gasket, said follower ring having a pipe opening the peripheral edge of which is spaced from the pipe and an annular inner face extending radially outwardly from said edge, a plurality of locking elements disposed in the gasket recess adjacent said inner face of the follower ring, said elements being of a shape and size to wedge between said edge and the pipe, said locking elements being held by said gasket in an initial position substantially blocking said space to restrain extrusion of gasket material but being slightly spaced circumferentially and spaced radially from the pipe and in engagement with the inner face of the follower ring radially outwardly of the edge of the pipe opening in the follower ring, when the gasket is in uncompressed condition so as to be pushed ahead of said follower ring without wedging action as the latter is initially moved toward the body, said gasket having an annular portion that is disposed radially outwardly of said locking elements and is expandable in a radially inward direction by the application of pressure in an axial direction by movement of the follower ring toward the body to trip said locking elements by pressing them radially inwardly so that they ride in under the edge of the pipe opening in the follower ring and are thereby released to wedge between said edge and the pipe upon further movement of the follower ring toward said body each of said locking elements being too large to pass completely through the space between said edge.

References Cited in the file of this patent

UNITED STATES PATENTS

| | | |
|---|---|---|
| 2,163,810 | Raybould | June 27, 1939 |
| 2,460,032 | Risley | Jan. 25, 1949 |
| 2,474,319 | Muller | June 28, 1949 |
| 2,529,552 | Herold | Nov. 14, 1950 |
| 2,561,887 | Risley | July 24, 1951 |
| 2,755,111 | Newell | July 17, 1956 |